(12) United States Patent
Sakuma et al.

(10) Patent No.: US 9,689,885 B2
(45) Date of Patent: Jun. 27, 2017

(54) SENSOR UNIT, ELECTRONIC APPARATUS AND MOVING OBJECT

(71) Applicant: Seiko Epson Corporation, Tokyo (JP)

(72) Inventors: Masayasu Sakuma, Shiojiri (JP); Taketo Chino, Hokuto (JP)

(73) Assignee: Seiko Epson Corporation (JP)

( * ) Notice: Subject to any disclaimer, the term of this patent is extended or adjusted under 35 U.S.C. 154(b) by 279 days.

(21) Appl. No.: 14/501,583

(22) Filed: Sep. 30, 2014

(65) Prior Publication Data

US 2015/0096372 A1 Apr. 9, 2015

(30) Foreign Application Priority Data

Oct. 8, 2013 (JP) ................................. 2013-210777

(51) Int. Cl.
| G01P 15/08 | (2006.01) |
| G01P 3/00 | (2006.01) |
| G01P 1/00 | (2006.01) |
| G01P 1/02 | (2006.01) |

(52) U.S. Cl.
CPC ................ *G01P 3/00* (2013.01); *G01P 1/006* (2013.01); *G01P 1/023* (2013.01)

(58) Field of Classification Search
CPC .................................. G01P 1/006; G01P 1/023
USPC .......................................................... 73/493
See application file for complete search history.

(56) References Cited

U.S. PATENT DOCUMENTS

| 5,852,320 | A | 12/1998 | Ichihashi | |
| 6,369,435 | B1 | 4/2002 | Igel | |
| 6,738,721 | B1 | 5/2004 | Drucke et al. | |
| 6,979,873 | B2 * | 12/2005 | Fujii | B81B 7/0058 |
| | | | | 73/493 |
| 7,571,647 | B2 * | 8/2009 | Takemasa | G01P 1/006 |
| | | | | 73/493 |
| 2009/0025970 | A1 | 1/2009 | Yanagisawa | |
| 2009/0071711 | A1 | 3/2009 | Takano et al. | |
| 2009/0255335 | A1 | 10/2009 | Fly et al. | |
| 2014/0254118 | A1 | 9/2014 | Saito | |

FOREIGN PATENT DOCUMENTS

| JP | 09-222372 A | 8/1997 |
| JP | 2000-150914 A | 5/2000 |
| JP | 2007-180240 A | 7/2007 |
| JP | 2007-195145 A | 8/2007 |
| JP | 2012-089803 A | 5/2012 |
| JP | 2013-051256 A | 3/2013 |
| JP | 2014-175513 A | 9/2014 |

* cited by examiner

*Primary Examiner* — John Chapman, Jr.
(74) *Attorney, Agent, or Firm* — Harness, Dickey & Pierce, P.L.C.

(57) ABSTRACT

A sensor unit includes a sensor and a mount board on which the sensor is mounted. The mount board includes a mount terminal connected to a terminal provided in the sensor and a wiring extending from the mount terminal. The wiring is not provided in a region where the sensor and the mount board overlap each other when viewed in plan.

7 Claims, 10 Drawing Sheets

SENSOR UNIT, ELECTRONIC APPARATUS AND MOVING OBJECT

BACKGROUND

1. Technical Field

The present invention relates to a sensor unit, an electronic apparatus using the sensor unit and a moving object.

2. Related Art

A physical quantity sensor such as an acceleration sensor or an angular velocity sensor is widely known. The physical quantity sensor is mounted on a mount board by connecting a mount terminal provided on the mount board and a terminal provided on the physical quantity sensor. As the mount terminal, for example, a land grid array can be used. The land grid array includes plural mount terminals arranged in a line along the contour of the physical quantity sensor. The plural mount terminals can be arranged in a line along, for example, one side of the square contour, or form a line so as to go round the contour. In recent years, with miniaturization of an electronic apparatus using a sensor unit, miniaturization of the sensor unit is required, and the mounting density thereof increases. Thus, wirings connected to the mount terminals become complicated, and the wirings are generally provided also on an inner periphery where the mount terminals are arranged.

JP A-2007-195145 is an example of related art.

However, the foregoing physical quantity sensor has a temperature characteristic. An output signal at the time of no load (physical quantity to be detected does not act), that is, a zero point voltage is changed according to temperature change. The change occurs according to the temperature change. According to the observation of the inventor, it was found that when a wiring made of a conductive material was provided in a region overlapping a physical quantity sensor mounted on a mount board when viewed in plan, a singular point (hereinafter referred to as "bias shift") occurred in a specific temperature region in the hysteresis of the temperature characteristic of the physical quantity sensor. There is a problem that when the bias shift occurs, the zero point voltage significantly varies in the specific temperature region, and excellent temperature characteristics can not be obtained. Besides, there is a fear that the reliability of measurement results is lowered by the bias shift.

SUMMARY

An advantage of some aspects of the invention is to solve at least a part of the problems described above and the invention can be implemented as the following forms or application examples.

Application Example 1

This application example of the invention is directed to a mount board including a base member including a first surface provided with a mount region where a sensor is mounted, wherein the mount region includes a first portion provided with a mount terminal to which a terminal provided in the sensor is connected, and a second portion including an insulation part, and a wiring extends from the mount terminal to outside of the mount region. Another aspect of the invention is directed to a sensor unit including a sensor and a mount board on which the sensor is mounted, wherein the mount board includes a mount terminal connected to a terminal provided in the sensor and a wiring extending from the mount terminal, and the wiring is not provided in a region where the sensor and the mount board overlap each other when viewed in plan.

According to the mount board of this application example, the mount terminal is provided in the first portion of the mount region where the sensor is mounted, and the wiring extends from the mount terminal to the outside of the mount region. Accordingly, the second portion including the insulation part is provided in the mount region exclusively from the first portion. Thus, distortion of the base member due to thermal expansion of the wiring or the like is suppressed from occurring in the mount region, and distortion can be suppressed from occurring in the sensor mounted in the mount region.

Application Example 2

In the mount board according to the application example described above, it is preferable that the insulation part of the mount region of the mount board includes at least one of an insulation layer provided on a surface of the base member and an exposed portion of the surface of the base member. Besides, it is preferable that the mount board includes an insulation part in the overlap region except for the mount terminal.

According to the mount board of this application example, since the insulation part includes at least one of the insulation layer and the exposed portion of the surface of the base member, the insulation part is provided in the second portion exclusively from the mount terminal provided in the first portion, and a portion between the mount terminals can be insulated.

Application Example 3

In the mount board according to the application example described above, it is preferable that a recessed part or a through hole is provided in the second portion of the mount board. Besides, it is preferable that in the mount region, a recessed part or a through hole exists in a region other than the mount terminal in the overlap region.

According to the mount board of this application example, the recessed part or the through hole is provided in the second portion of the mount region. Accordingly, when distortion of the base member occurs due to the thermal expansion, the recessed part absorbs the distortion, so that distortion can be suppressed from occurring in the mounted sensor. Besides, when the through hole is provided, the heat stored in the base member is efficiently dissipated, and the thermal expansion of the base member can be suppressed.

Application Example 4

In the mount board according to the application example described above, it is preferable that the base member of the mount board includes plural layers.

According to the mount board of this application example, since the base member has the multi-layer structure including the plural layers, the wiring extended from the mount terminal can be provided between the respective layers. By this, the distortion occurring on the first surface of the mount region closest to the sensor can be dispersed. Besides, the distortion of the base member due to the thermal expansion can be absorbed by the respective layers. Thus, the distortion of the base member is suppressed, and the distortion can be suppressed from occurring in the mounted sensor.

Application Example 5

In the mount board according to the application example described above, it is preferable that in the mount board, the wiring is provided in at least one of the plural layers, and when the base member is viewed in plan from a vertical direction crossing the first surface, the wiring is provided around the mount region. Besides, it is preferable that the mount board includes a via which is provided outside the overlap region, is connected to the wiring and extends in a thickness direction of the mount board.

According to the mount board of this application example, the wiring provided in at least one of the plural layers is provided around the mount region. Accordingly, the wiring is not provided in the respective layers of the base member overlapping the mount region. Thus, distortion of the base member due to thermal expansion of the wiring or the like is suppressed from occurring in the mount region, and distortion can be suppressed from occurring in the sensor mounted in the mount region.

Application Example 6

This application example of the invention is directed to a sensor unit including a sensor including a connection surface provided with an output terminal, and a base member including a first surface on which a mount region provided with the sensor is provided, the mount region includes a first portion provided with a mount terminal to which the terminal provided in the sensor is connected and a second portion including an insulation part, and a wiring is extended from the mount terminal to outside of the mount region.

According to the sensor unit of this application example, the mount terminal is provided in the first portion of the mount region where the sensor is mounted, and the wiring is extended from the mount terminal to the outside of the mount region. Besides, in the mount region, the mount terminal is provided in the first portion, and the insulation part is provided in the second portion provided exclusively from the first portion. Accordingly, distortion of the base member due to thermal expansion of the wiring or the like is suppressed from occurring in the mount region, and distortion can be suppressed from occurring in the sensor mounted in the mount region. Thus, in the sensor unit, characteristic change of the sensor due to the occurrence of distortion of the mounted sensor can be suppressed from occurring.

Application Example 7

In the sensor unit according to the application example described above, it is preferable that the sensor includes a groove part on a surface mounted on the mount board.

According to the sensor unit of this application example, since the groove part is provided on the connection surface of the sensor, when distortion occurs in the sensor by distortion occurring in the base member, the distortion can be absorbed by the groove part. Thus, characteristic change of the sensor can be suppressed from occurring.

Application Example 8

This application example of the invention is directed to an electronic apparatus including the foregoing sensor unit described above.

According to the electronic apparatus of this application example, since the sensor unit in which sensor characteristic change is suppressed is included, the reliability of the electronic apparatus can be raised.

Application Example 9

This application example of the invention is directed to a moving object including the foregoing sensor unit.

According to the moving object of this application example, since the sensor unit in which sensor characteristic change is suppressed is included, the reliability of the moving object can be raised.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the drawings. Incidentally, in the respective drawings, in order to cause respective components to have sufficient size to be recognized on the drawings, the sizes and ratios of the respective components may be different from those of actual components.

Amount board according to an embodiment and a sensor unit in which a sensor is mounted on the mount board will be described with reference to FIG. 1 to FIG. 8.

Figure 1:
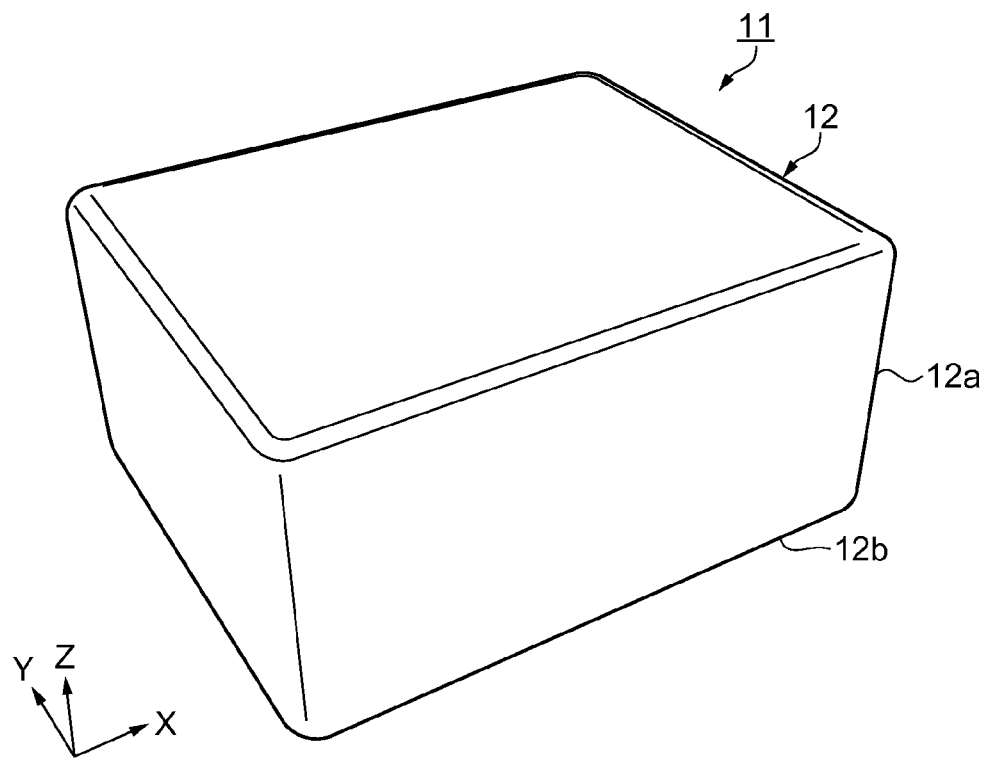
FIG. 1 is a perspective view schematically showing an outer appearance of a sensor unit in which a sensor is mounted on a mount board according to an embodiment.
Figure 2:
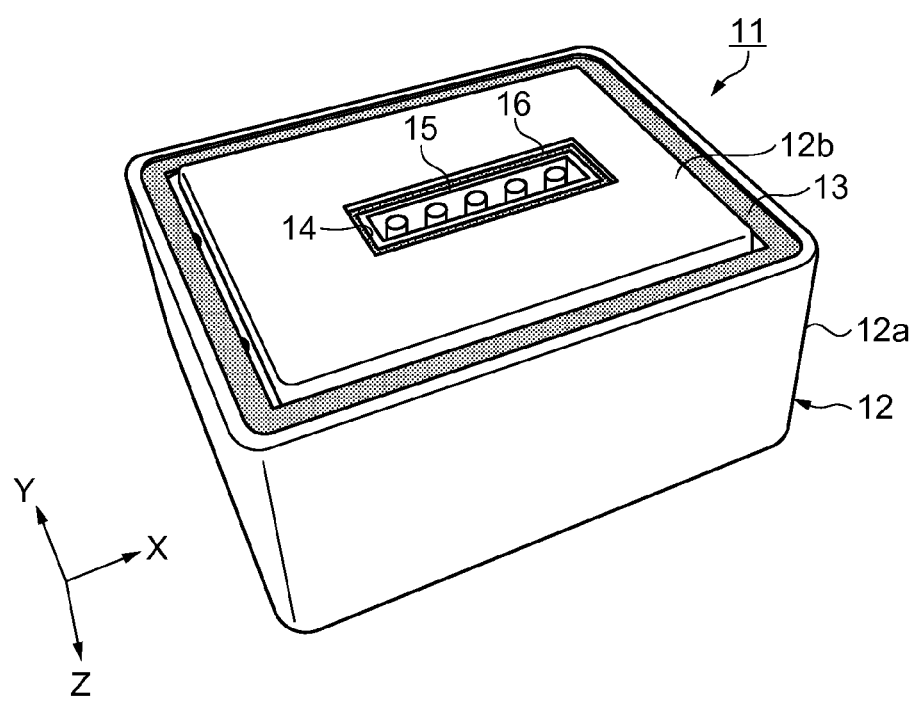
FIG. 2 is a perspective view schematically showing the outer appearance when viewed from a back side of the sensor unit shown in FIG. 1.
Figure 3:
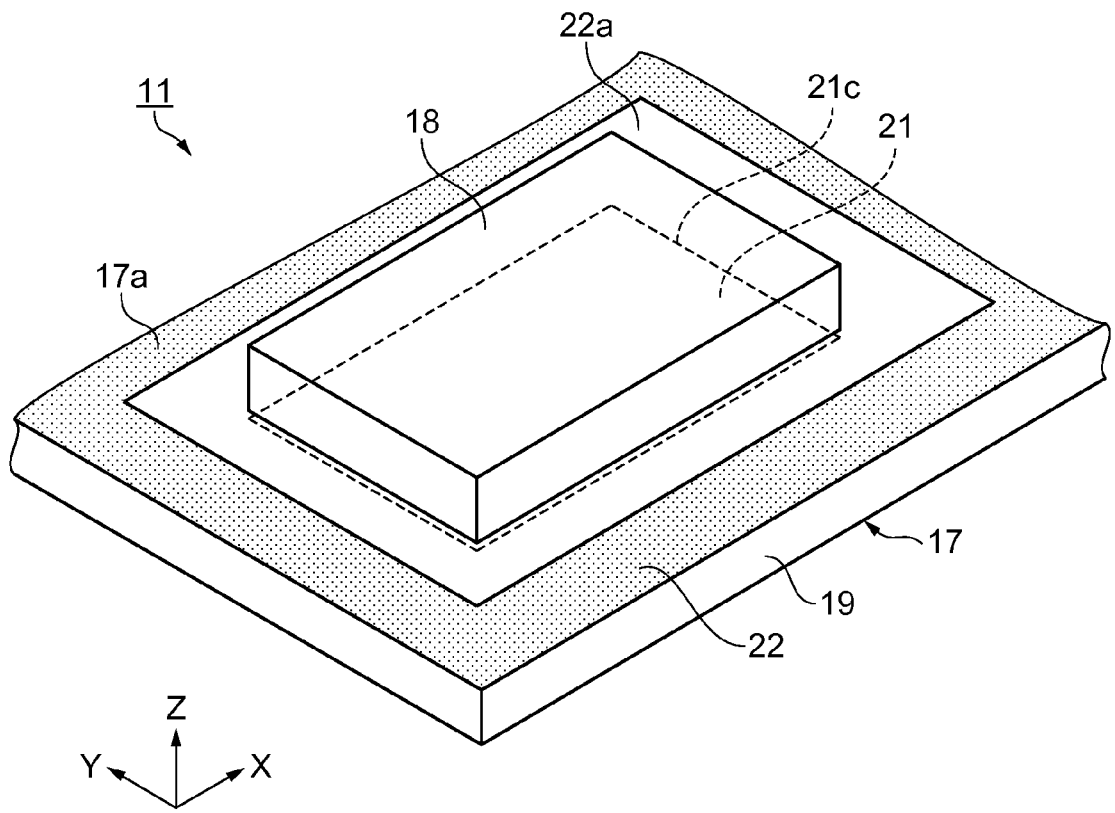
FIG. 3 is a perspective view schematically showing a state where the sensor is mounted on the mount board.
Figure 4:
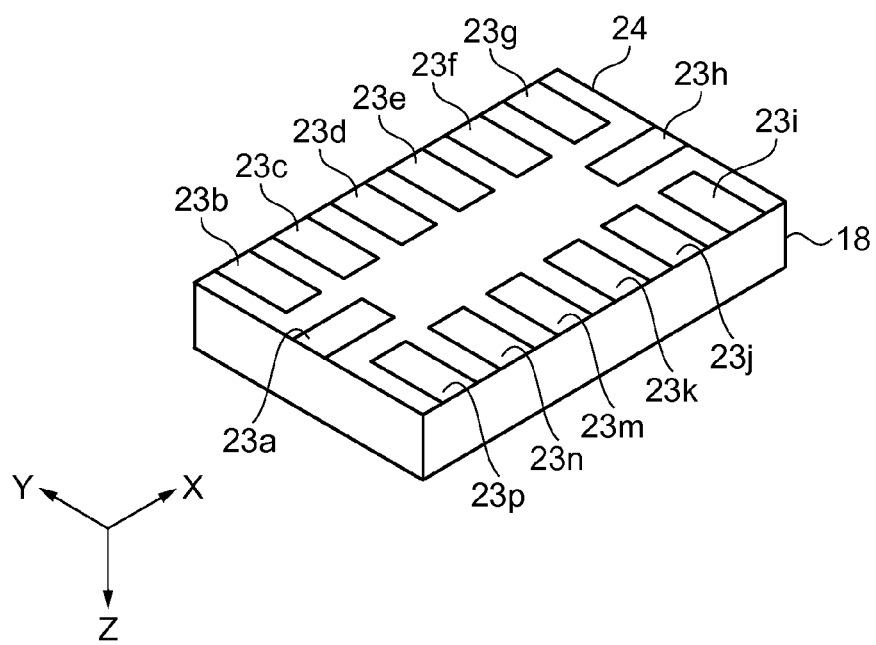
FIG. 4 is a perspective view schematically showing an outer appearance of the sensor shown in FIG. 3 when viewed from a back side.
Figure 5:
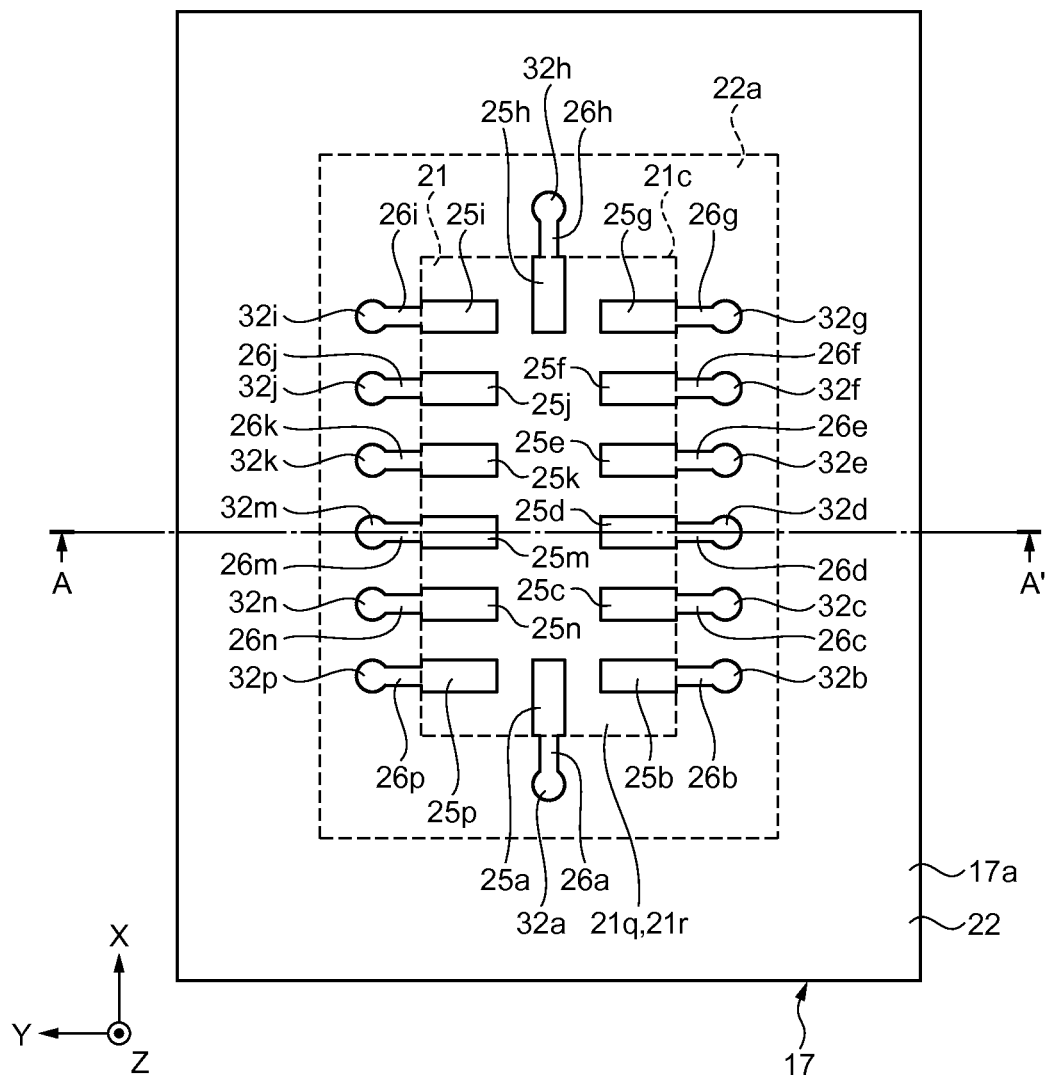
FIG. 5 is a plan view schematically showing a plane of the mount board when viewed in plan from a first surface of the mount board on which the sensor shown in FIG. 3 is mounted.
Figure 6:
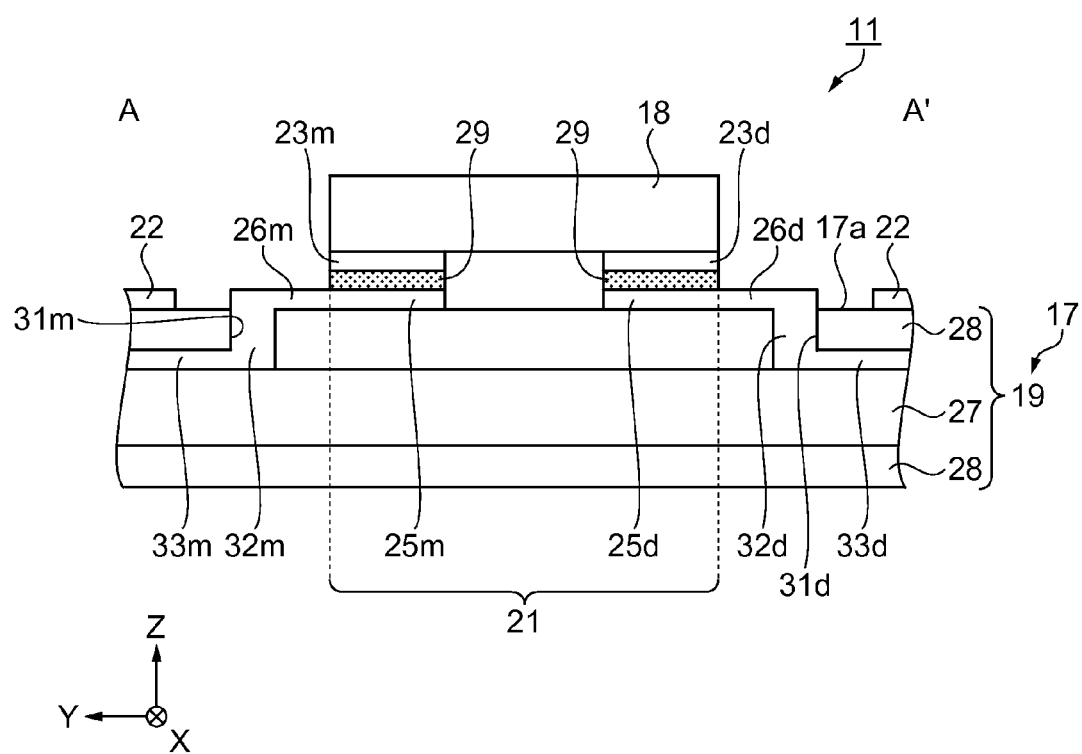
FIG. 6 is a sectional view schematically showing a section of the sensor unit including the mount board on which the sensor shown in FIG. 5 is mounted.
Figure 7:
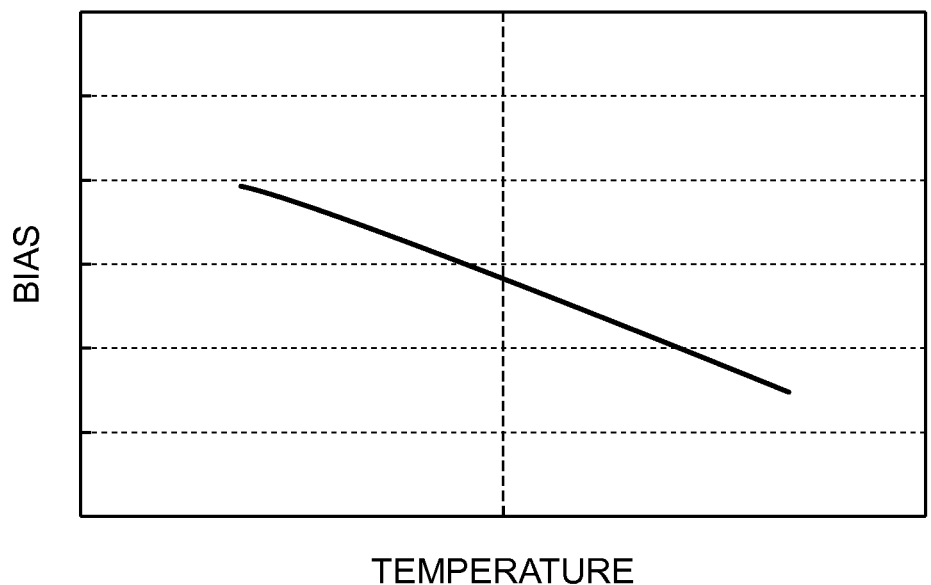
FIG. 7 is a graph showing a sensor temperature characteristic of the sensor unit according to the embodiment.
Figure 8:
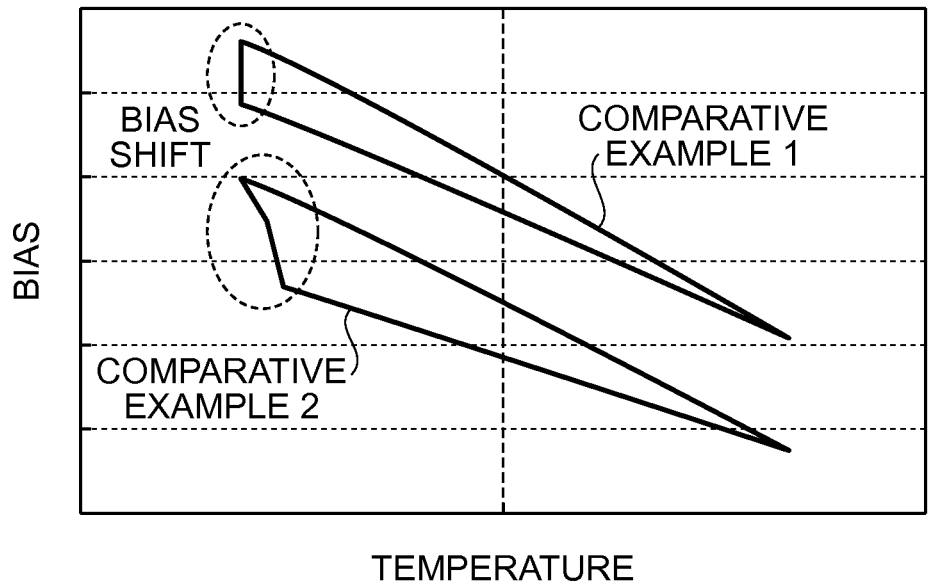
FIG. 8 is a graph showing a sensor temperature characteristic of a sensor unit according to a comparative example.

FIG. 1 is a perspective view schematically showing an outer appearance of the sensor unit using the mount board according to the embodiment. FIG. 2 is a perspective view schematically showing the outer appearance when viewed from a back side of the sensor unit shown in FIG. 1. FIG. 3 is a perspective view schematically showing a state where the sensor is mounted on the mount board, and illustration of wirings extended from mount terminals and the like is omitted. FIG. 4 is a perspective view schematically showing an outer appearance of the sensor shown in FIG. 3 when viewed from a back side. FIG. 5 is a mount board plan view schematically showing a plane when viewed in plan from a first surface of the mount board shown in FIG. 3, and illustration of the sensor is omitted. FIG. 6 is a sectional view schematically showing a section of the sensor unit along line A-A' shown in FIG. 5. FIG. 7 is a graph showing a sensor temperature characteristic of the sensor unit according to the embodiment. FIG. 8 is a graph showing a sensor temperature characteristic of a sensor unit according to a comparative example.

Structure of the Sensor Unit

A sensor unit 11 shown in FIG. 1 includes a housing 12. The housing 12 is formed into, for example, a rectangular parallelepiped box shape. In the housing 12, the inner space of the rectangular parallelepiped is partitioned. The housing 12 is divided into a box body 12a and a base 12b. The box body 12a covers a top surface and four side surfaces of the inner space. The base 12b covers a bottom surface of the inner space. The box body 12a and the base 12b are molded of, for example, aluminum (Al) material. The surfaces of the box body 12a and the base 12b are covered with plating film of, for example, nickel (Ni).

As shown in FIG. 2, the base 12b is provided so as to close the open surface of the box body 12a. A sealing member 13 is provided in a gap between the base 12b and the box body 12a along the contour of the base 12b. The base 12b is provided with an opening 14. A connector 15 is disposed in the opening 14. The connector 15 can be received by a receiving side connector (not shown). The connector 15 constitutes an outer terminal of the sensor unit 11. A sealing member 16 is filled in a gap between the connector 15 and the base 12b along the contour of the connector 15. The inner space of the housing 12 can be airtightly sealed by the foregoing structure.

As shown in FIG. 3, the sensor unit 11 includes an acceleration sensor 18 as a physical quantity sensor, and a mount board 17 (hereinafter simply referred to as "board 17") as a base member on which the acceleration sensor 18 is mounted. The acceleration sensor 18 is mounted on a first surface 17a of the board 17. The acceleration sensor 18 is formed into, for example, a flat rectangular parallelepiped shape. Incidentally, the shape of the acceleration sensor 18 is not particularly limited and may be another shape such as a square. The shape corresponds to the contour line of the acceleration sensor 18. The board 17 and the acceleration sensor 18 are contained in the inner space of the housing 12.

Structure of the Mount Board

The board 17 includes a board body 19 mainly made of, for example, an insulation material. A mount region 21 as a projection image of the acceleration sensor 18 is partitioned (set) on the surface (the first surface 17a of the board 17) of the board body 19. The projection image of the acceleration sensor 18 corresponds to a shadow of the acceleration sensor 18 projected on the first surface 17a when a parallel light beam impinges on the first surface 17a from the vertical direction. In other words, the mount region 21 is a contour region of the acceleration sensor 18 after the acceleration sensor 18 is mounted when viewed in plan.

The board 17 includes a shield electrode (conductive film for shielding) 22. The shield electrode 22 is provided as a solid film of a metal such as copper or another conductive member. The shield electrode 22 is set to, for example, the ground potential. As described after, the shield electrode 22 is provided to be separated from the mount region 21 by a specified interval. The shield electrode 22 surrounds a non-electrode formation portion 22a. The mount region 21 is partitioned in the non-electrode formation portion 22a. The shield electrode 22 provided on the first surface 17a is provided exclusively from the mount region 21 and the non-electrode formation portion 22a.

As shown in FIG. 4, the acceleration sensor 18 is provided with plural output terminals 23a, 23b, 23c, 23d, 23e, 23f, 23g, 23h, 23i, 23j, 23k, 23m, 23n and 23p (hereinafter, collectively called "output terminals 23" or abbreviated as "output terminals 23a to 23p"). The output terminals 23 are arranged in, for example, a single line along a contour line 24 of the acceleration sensor 18.

Here, the output terminals 23a to 23p are provided so as to go around the contour of the acceleration sensor 18 and so as to form a line. The output terminals 23 are used for input and output of a signal and for supply of power to the acceleration sensor 18. For example, acceleration signals for each of three orthogonal axes are outputted from the output terminals 23a, 23b and 23c. Besides, the output terminals 23d is connected to the ground, and the other output terminals 23 are connected to a power supply and the like. The output terminals 23 are made of a conductive material such as copper (Cu). The shapes of the output terminals 23 are not particularly limited, and any shape may be adopted as long as the output terminals are stably connected to after-mentioned mount terminals 25.

As shown in FIG. 5, plural mount terminals 25a, 25b, 25c, 25d, 25e, 25f, 25g, 25h, 25i, 25j, 25k, 25m, 25n, 25p (hereinafter, collectively called "mount terminals 25" or abbreviated as "mount terminals 25a to 25p") are provided in the mount region 21 set on the first surface 17a of the board 17. Besides, a first portion as a region where the mount terminals 25 are provided is provided in the mount region 21. Further, a second portion 21q is provided in the mount region 21 exclusively from the first portion where the mount terminals 25 are provided. The second portion 21q includes an insulation part 21r.

In the embodiment, an after-mentioned build-up layer 28 is provided as the insulation part 21r. Incidentally, since the first portion overlaps the mount terminals 25, the illustration is omitted in the drawings.

The mount terminals 25 are arranged in a single line along a contour line 21c of the mount region 21. The arrangement of the output terminals 23 is reflected in the mount terminals 25. Accordingly, the mount terminals 25 are arranged to be isolated from each other in the mount region 21. The output terminals 23a, 23b and 23c are individually connected to the corresponding mount terminals 25. The output terminal (ground terminal) 23d is connected to the mount terminal 25d. The other output terminals 23 are also individually connected to the corresponding mount terminals 25.

The mount terminals 25 are made of a conductive material such as copper (Cu). The shapes of the mount terminals 25 are not particularly limited, and any shape may be adopted as long as the mount terminals are stably connected to the foregoing output terminals 23.

Besides, the mount terminals 25 are provided with wirings 26 extending from the mount terminals 25 to the outside (non-electrode formation portion 22a) of the mount region 21. That is, the mount terminals 25 are exclusively provided in the mount region 21, and the wirings 26 connected to the mount terminals 25 are provided outside the mount region 21. The wirings 26 include wirings 26a, 26b, 26c, 26d, 26e, 26f, 26g, 26h, 26i, 27j, 26k, 26m, 26n and 2p (hereinafter, collectively called "wirings 26" or abbreviated as "wirings 26a to 26p") correspondingly to the mount terminals 25a to 25p.

The wirings 26 are made of a conductive material such as copper (Cu). The shapes of the wirings 26 are not particularly limited, and any shape may be adopted as long as the wirings are stably connected to the foregoing mount terminals 25 and after-mentioned vias 32 (conductors 31).

As shown in FIG. 6, the board body 19 includes a core layer 27 and build-up layers 28 provided on the front and back of the core layer 27. The core layer 27 has such rigidity that for example, the shape can be kept independently. The core layer 27 may be a single layer or a prepreg laminate. The build-up layers 28 are laminated on the front and back of the core layer 27. The core layer 27 and the build-up layers 28 are respectively formed with insulation layers. The insulation layers are made of a resin. The resin is impregnated with carbon fibers or glass fibers. The mount terminals 25 (only apart is shown in FIG. 6) are provided on the first surface 17a of the board 17 as the surface of the build-up layer 28. The mount terminals 25 are connected to the corresponding output terminals 23 by connection members 29 using, for example, solder, and the acceleration sensor 18 is mounted.

The vias 32 are provided inside the board body 19. The vias 32 include vias 32a, 32b, 32c, 32d, 32e, 32f, 32g, 32h, 32i, 32j, 32k, 32m, 32n and 32p (hereinafter, collectively called "vias 32" or abbreviated as "vias 32a to 32p") correspondingly to the mount terminals 25a to 25p.

The vias 32 are respectively extended from the mount terminals 25, and pass through at least the outermost insulation layer among the insulation layers, that is, the build-up layer 28. The vias 32 extend in parallel to each other in a direction (Z-axis direction) orthogonal to the first surface 17a as the surface of the build-up layer 28, that is, in a thickness direction of the board body 19. The conductors 31 made of a conductive material are provided inside the vias 32, and the vias function as conductive vias.

The conductors 31 provided inside the vias 32 include conductors 31a, 31b, 31c, 31d, 31e, 31f, 31g, 31h, 31i, 31j, 31k, 31m, 31n and 31p (Hereinafter, collectively called "conductors 31" or abbreviated as "conductors 31a to 31p") correspondingly to the vias 32a to 32p and the mount terminals 25a to 25p. One ends of the conductors 31 are connected to the wirings 26, and the other ends are connected to wirings 33.

The wirings 33 connected to the conductors 31 are provided between the insulation layers. The wirings 33 include wirings 33a, 33b, 33c, 33d, 33e, 33f, 33g, 33h, 33i, 33j, 33k, 33m, 33n and 33p (hereinafter, collectively called "wirings 33" or abbreviated as "wirings 33a to 33p") correspondingly to the vias 32a to 32p and the mount terminals 25a to 25p.

Here, the wirings 26 connected to the mount terminals 25, the vias 32 (the conductors 31) and the wirings 33 are provided exclusively from the mount region 21. In other words, the wirings 26, the vias 32 (the conductors 31) and the wirings 33 are provided on the board 17 except for the mount region 21 when viewed in plan from the vertical direction crossing the first surface 17a of the board 17. That is, the wirings 26, the vias 32 (the conductors 31) and the wirings 33 are provided to go around the mount region 21.

By this, the distortion of the board 17 due to the deformation of the wirings 26, the vias 32 (the conductors 31) and the wirings 33 caused by thermal expansion can be suppressed from being transmitted to the acceleration sensor 18 provided in the mount region 21. That is, the distortion (deformation) of the acceleration sensor 18 due to the distortion of the board due to the deformation of the wirings 26, the vias 32 (the conductors 31) and the wirings 33 caused by the thermal expansion can be suppressed.

The inventor verified the technical effect of the invention. An output signal at the time of no load (when a physical quantity to be detected does not act), that is, a zero point voltage was measured according to temperature change. As a result, as shown in FIG. 7, in the sensor unit 11 of the embodiment, the zero point voltage linearly changed with respect to the temperature change. Accordingly, it was confirmed that the temperature characteristic of the sensor unit 11 in which the wirings 26 and 33 and the vias 32 were not provided in the mount region 21 was kept excellent.

Further, the inventor verified two comparative examples. In sensor units (not shown) as the comparative examples, wirings made of a conductive material were provided in the mount region. Similarly to the foregoing verification, the zero point voltage at the time of no load was measured according to the temperature change. As a result, as shown in FIG. 8, singular points (bias shifts) occurred in certain temperature regions of temperature characteristics of the sensors. This is conceivable to be caused by a fact that relative position shift and direction change occur between the wirings according to the temperature change, the position shift and direction change act on the mount terminals of the board, and distortion and stress are produced in the sensor through the output terminals. In such a case, even at the same temperature, the zero point voltage varies between the time of temperature rising and the time of temperature falling, and an excellent temperature characteristic can not be obtained.

Application Example of the Sensor Unit

Figure 9:
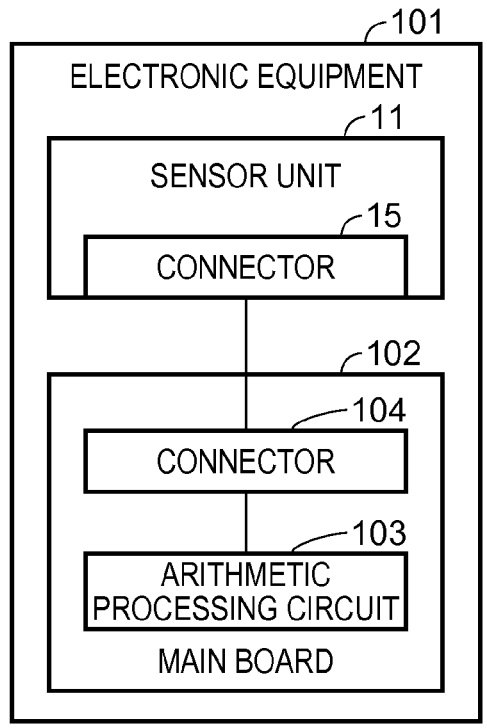
FIG. 9 is a block diagram schematically showing a structure of an electronic apparatus according to an embodiment.

The sensor unit 11 as described above is assembled in, for example, an electronic apparatus 101 as shown in FIG. 9 and is used. In the electronic apparatus 101, for example, an arithmetic processing circuit 103 and a connector 104 are mounted on a main board 102. The connector 104 is coupled with, for example, the connector 15 of the sensor unit 11. A detection signal is supplied to the arithmetic processing circuit 103 from the sensor unit 11. The arithmetic processing circuit 103 processes the detection signal from the sensor unit and outputs a processing result. As the electronic apparatus 101, for example, a motion sensing unit, a consumer game equipment, a motion analyzing apparatus, a surgical operation navigation system, a car navigation system and the like are exemplified.

Figure 10:
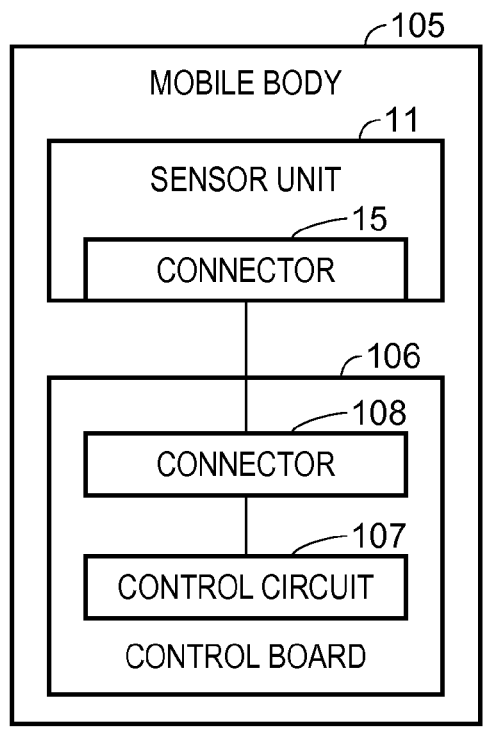
FIG. 10 is a block diagram schematically showing a structure of a moving object according to an embodiment.

Besides, for example, as shown in FIG. 10, the sensor unit 11 is assembled in a moving object 105 and is used. In the moving object 105, for example, a control circuit 107 and a connector 108 are mounted on a control board 106. The connector 108 is coupled with, for example, the connector 15 of the sensor unit 11. The control circuit 107 is supplied with a detection signal from the sensor unit 11. The control circuit 107 processes the detection signal from the sensor unit 11 and can control the motion of the moving object 105 according to a processing result. As the control as stated above, behavior control of an automobile as the moving object 105, car navigation control, activation control of a car air bag, inertial navigation control of an air plane or a ship as the moving object 105, guidance control and the like are exemplified.

Figure 11:
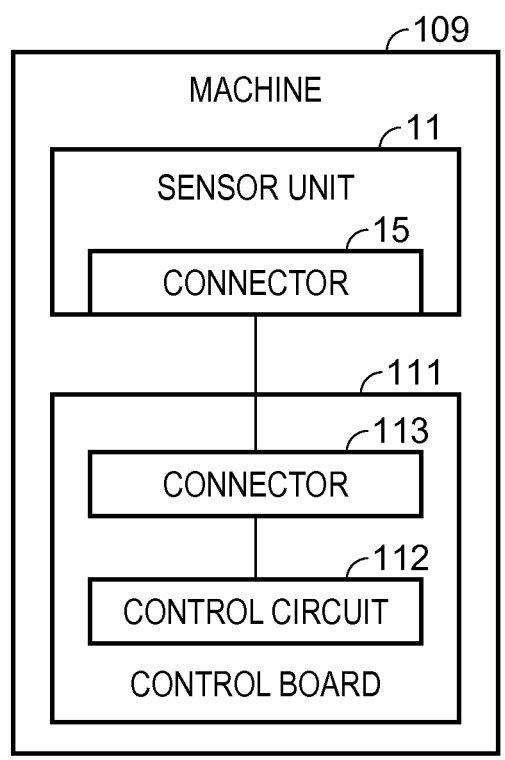
FIG. 11 is a block diagram schematically showing a structure of a machine according to an embodiment.

Besides, for example, as shown in FIG. 11, the sensor unit 11 is assembled in a machine 109 and is used. In the machine 109, for example, a control circuit 112 and a connector 113 are mounted on a control board 111. The connector 113 is coupled with, for example, the connector 15 of the sensor unit 11. The control circuit 112 is supplied with a detection signal from the sensor unit 11. The control circuit 112 processes the detection signal from the sensor unit 11, and can control the operation of the machine 109 according to a processing result. As the control as stated above, vibration control and operation control of an industrial machine, motion control of a robot and the like are exemplified.

According to the foregoing embodiment, the following effects can be obtained.

According to the sensor unit 11 provided with the acceleration sensor 18 mounted on the board 17 (mount board) as described above, the mount terminals 25 are exclusively provided in the mount region 21 where the acceleration sensor 18 is mounted, and the wirings 26 and 33 extend from the mount terminals 25 to the outside (non-electrode formation portion 22a) of the mount region 21. That is, the wirings 26 and 33 are not provided in the mount region 21. Accordingly, the distortion of the board 17 due to the thermal expansion of the wirings 26 and 33 is suppressed from occurring in the mount region 21, and distortion can be suppressed from occurring in the acceleration sensor 18 mounted in the mount region 21. Thus, in the acceleration sensor 18 mounted on the board 17 as described above, the bias shift is suppressed from occurring in the hysteresis of the temperature characteristic, and the highly reliable sensor unit 11 can be realized.

MODIFIED EXAMPLES

Incidentally, no limitation is made to the foregoing embodiment, and various changes and improvements can be made within the scope not departing from the gist. Hereinafter, modified examples will be described.

Modified Example 1

Figure 12:
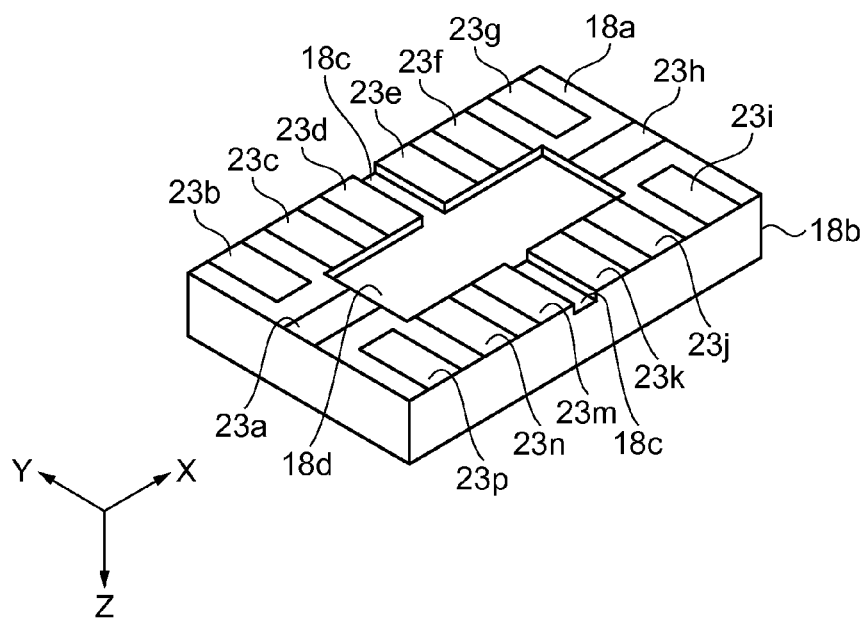
FIG. 12 is a perspective view schematically showing an outer appearance of a sensor mounted on a sensor unit according to a modified example 1 when viewed from aback side.
Figure 13:
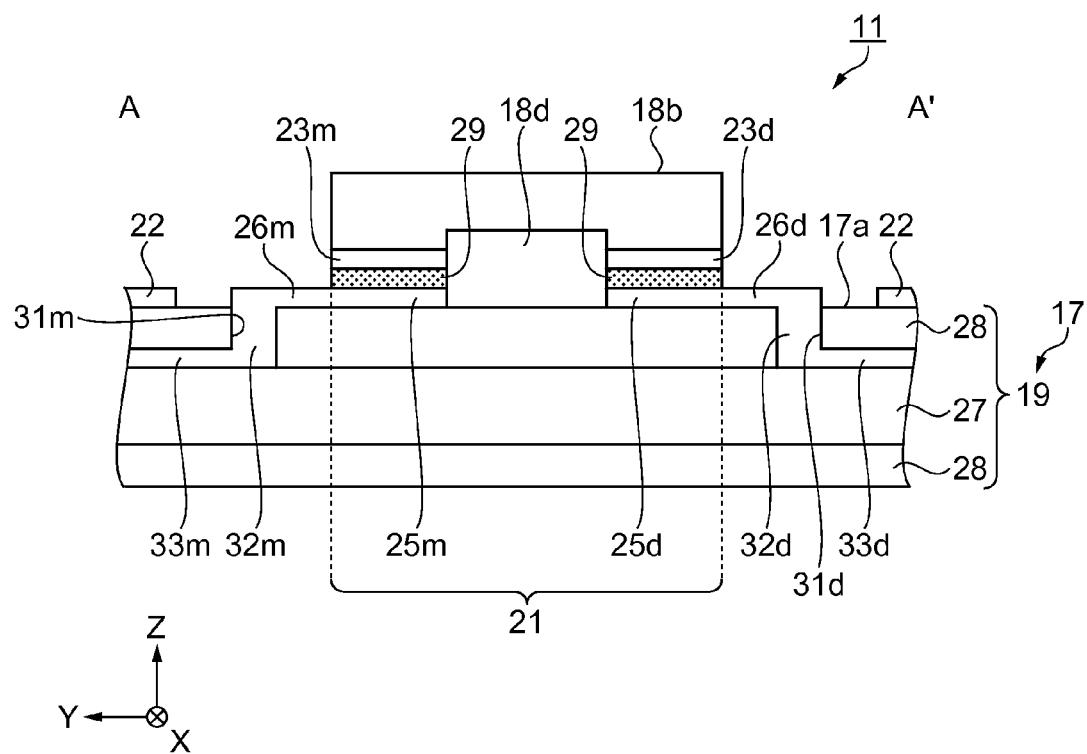
FIG. 13 is a sectional view schematically showing a section of the sensor unit including a mount board on which the sensor according to the modified example 1 is mounted.

FIG. 12 is a perspective view schematically showing an outer appearance of an acceleration sensor 18b mounted on a sensor unit 11 according to a modified example 1 when viewed from the back side. FIG. 13 is a sectional view schematically showing the section of the sensor unit 11 according to the modified example, and is a sectional view schematically showing the section of the sensor unit along line A-A' shown in FIG. 5.

In the sensor unit 11 of the modified example 1, as shown in FIG. 12, groove parts 18c are provided in a connection surface 18a on which output terminals 23 of the acceleration sensor 18b are provided. In the sensor unit 11, when distortion occurs in the acceleration sensor 18b, since the groove parts 18c absorb the distortion, the bias shift caused by the distortion can be suppressed.

Besides, in the sensor unit 11 of the modified example, as shown in FIG. 12 and FIG. 13, a concave-shaped recessed part 18d may be provided in a region exclusive from the output terminals 23 provided on the connection surface 18a of the acceleration sensor 18b. In the sensor unit 11, when distortion occurs in the acceleration sensor 18b, since the recessed part 18d absorbs the distortion, the bias shift caused by the distortion can be further suppressed.

Modified Example 2

Figure 14:
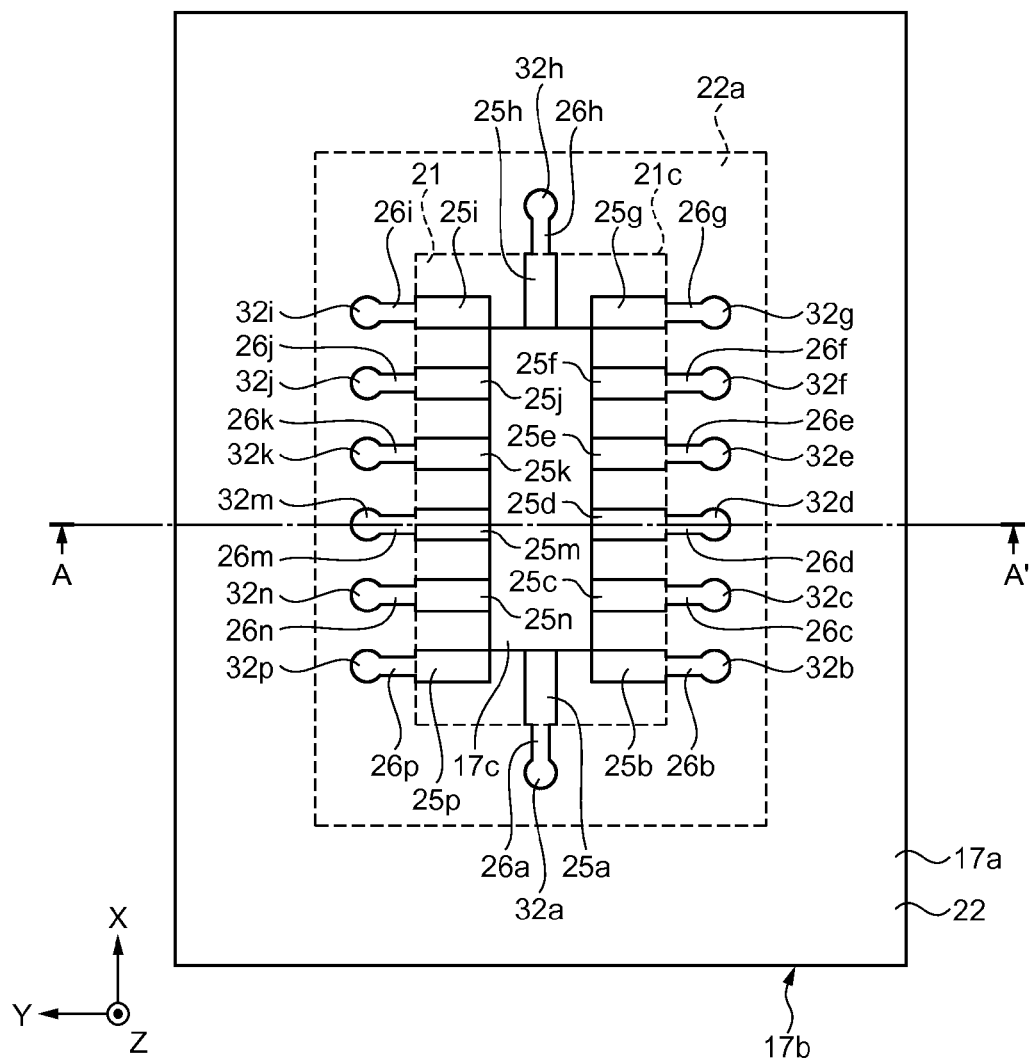
FIG. 14 is a plan view schematically showing a plane of a mount board mounted with a sensor when viewed in plan from a first surface of the mount board according to a modified example 2.

FIG. 14 is a plan view schematically showing a plane when a board 17b according to a modified example 2 is viewed in plan from a first surface 17a, and illustration of a sensor is omitted. Besides, FIG. 15 is a sectional view schematically showing a section of a sensor unit 11 including the board 17b along line A-A' shown in FIG. 14.

Figure 15:
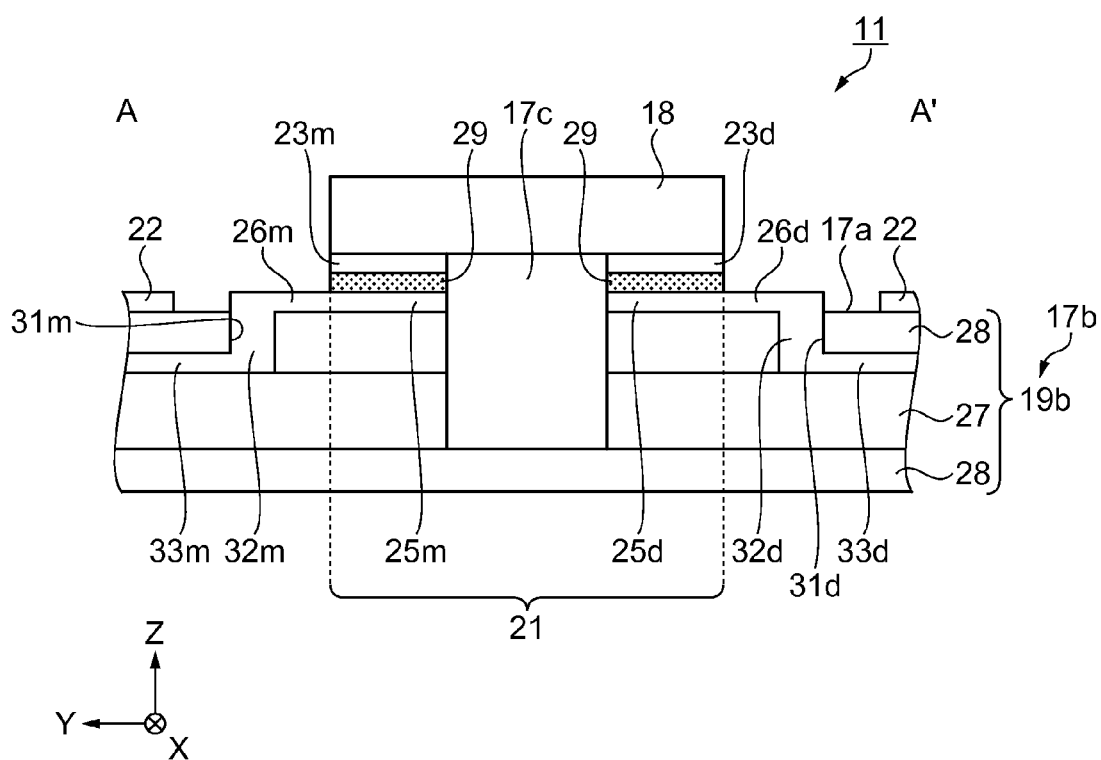
FIG. 15 is a sectional view schematically showing a section of a sensor unit including the mount board mounted with the sensor according to the modified example 2.

In the board 17b of the modified example 2, as shown in FIG. 14 and FIG. 15, a recessed part 17c as a hole with a bottom is provided exclusively from mount terminals 25 in a mount region 21 set on a first surface 17a of the board 17b. In the board 17b, when distortion due to thermal expansion of the board 17 occurs, the recessed part 17c absorbs the distortion. Thus, the distortion is suppressed from being transmitted to an acceleration sensor 18 mounted on the board 17b, and the bias shift of the acceleration sensor 18 caused by the distortion can be suppressed. Incidentally, the recessed part 17c may be a through hole. When the through hole is provided, the heat stored in the board 17b can be efficiently dissipated, and the thermal expansion of the board 17b can be suppressed.

The entire disclosure of Japanese Patent Application No. 2013-210777, filed Oct. 8, 2013 is expressly incorporated by reference herein.

What is claimed is:
1. A sensor unit comprising:
an acceleration sensor having a sensor terminal;
a mount board on which the acceleration sensor is mounted;
a mount terminal that is provided on a main surface of the mount board and that is connected to the sensor terminal;
a via that is provided in the mount board; and
a wiring that continuously extends from the mount terminal, that is continuously provided on the main surface of the mount board, and that is continuously provided in the via, wherein
the mount board includes a glass fiber therein,
the via is laterally shifted from the acceleration sensor in a plan view, and
the wiring is a single member that is configured from a first part connecting to the mount terminal to a second part located in the via through a third part located on the main surface of the mount board.
2. The sensor unit according to claim 1, wherein the mount board includes an insulation part in an area where the acceleration sensor is overlapped with the mount board in the plan view, and an insulation surface is the main surface of the mount board.
3. The sensor unit according to claim 1, wherein the mount board includes a recessed part in an area where the acceleration sensor is overlapped with the mount board in the plan view.
4. The sensor unit according to claim 1, wherein the mount board includes a plurality of layers.
5. The sensor unit according to claim 1, wherein the sensor includes a groove part on a surface mounted on the mount board.
6. An electronic apparatus comprising:
the sensor unit according to claim 1; and an arithmetic processing circuit that is configured to receive a detection signal from the sensor unit and that is configured to process the detection signal so as to output a processing result.

7. A moving object comprising:
the sensor unit according to claim 1; and
a control circuit that is configured to receive a detection signal from the sensor unit and that is configured to process the detection signal so as to output a processing result,
wherein the control circuit is configured to control motion of the moving object based on the processing result.

\* \* \* \* \*